United States Patent [19]

Mermelstein

[11] Patent Number: 4,497,202

[45] Date of Patent: Feb. 5, 1985

[54] LAMINAR FLOWMETER

[75] Inventor: Seymour Mermelstein, Newton, Mass.

[73] Assignee: Dresser Industries, Inc., Dallas, Tex.

[21] Appl. No.: 499,481

[22] Filed: May 31, 1983

[51] Int. Cl.³ .......................... G01F 5/00; F15D 1/02
[52] U.S. Cl. ........................................ 73/202; 138/42
[58] Field of Search .................. 13/202, 203, 861.52; 138/40, 42, 43

[56] References Cited

U.S. PATENT DOCUMENTS

| | | | |
|---|---|---|---|
| 3,851,526 | 12/1974 | Drexel | 73/202 |
| 3,917,222 | 11/1975 | Kay et al. | 138/42 X |
| 4,427,030 | 1/1984 | Jouwsma | 138/42 |
| 4,450,718 | 5/1984 | Hartemink | 73/202 |

Primary Examiner—Charles A. Ruehl
Attorney, Agent, or Firm—Daniel Rubin

[57] ABSTRACT

Apparatus for ensuring laminar flow through the main (non-measuring) branch of a split flow path flowmeter comprising a mass flow controller made of juxtaposed annular plates having interconnecting radial slots. The resulting flow passageways have proper length-to-hydraulic radius ratios to ensure that flow therethrough is laminar. A relatively inexpensive manufacturing technique is utilized to produce the annular plates whereby the radial slots are etched completely through each plate rather than being chemically etched or machined into only part of the thickness of each plate or bored through part of the interior of each plate.

16 Claims, 9 Drawing Figures

LAMINAR FLOWMETER

This invention relates to split-flow mass flowmeters, and more particularly, to apparatus for redirecting axial fluid flow along a branch of such a flowmeter into radial passageways dimensioned to assure substantially laminar flow along the branch.

Split-flow mass flowmeters generally operate on the principle of directing fluid flow through two parallel passageways, paths or branches, one for measuring the rate of mass flow of the fluid, the other providing the main or non-measuring branch. In order to provide accurate measurements, it is essential that an exact ratio be maintained between the individual path flow rates.

During laminar flow of a fluid, the flow rate is directly proportional to pressure drop and inversely proportional to viscosity. In contrast, during turbulent fluid flow, the flow rate is proportional to the square root of pressure drop and largely independent of viscosity. Thus, it is preferable when designing a split-flow mass flowmeter to provide conditions that will assure laminar flow in each path.

As is well known in the prior art, in order to maintain laminar flow, the ratio of the length to the effective hydraulic radius (hereinafter referred to as the "L/EHR ratio", the "effective hydraulic radius" being defined as the fluid passageway cross-sectional area divided by the passageway perimeter) in each path must be large enough to prevent turbulent flow. The measuring branch normally comprises a long conduit with a relatively small diameter so as to ensure laminar flow in that branch. This measuring branch normally handles a small proportion of the total fluid passing through both branches. Various prior art devices have been developed for assuring substantially laminar flow in the non-measuring (main) branch.

One prior art device for assuring substantially laminar flow in the non-measuring branch includes a flow restrictor comprising a series of disks made of fine mesh woven wire disposed in the main or nonmeasuring branch of the device. The fluid flowing through the restrictor is divided into numerous flow paths defined by the woven wire. Each flow path of the restrictor has an L/EHR ratio large enough to ensure laminar flow. Other embodiments of this type of prior art device utilize flow restrictors made from: (1) screen material rolled to form a hollow cylinder, (2) screen material spirally wound and secured around a mandrel, and (3) a porous plug made of compressed sintered particles. Flow restrictors of this type are exemplified in U.S. Pat. No. 3,792,609 and the references cited therein. The dimensions of the fluid passageways of the screen and compressed materials, however, cannot be precisely controlled.

In another prior art device, a flow restrictor installed in the non-measuring branch comprises a plurality of axially-stacked, juxtaposed disks, each disk having an aperture through its center. Channels or grooves are formed in at least one face of each disk so that when two such disks are juxtaposed, the channels each form a longitudinal half of an elongated conduit providing fluid communication between the central aperture and the outer perimeter of the disks. These disks are normally manufactured by chemically etching grooves into the faces of the disks so that each such groove penetrates only part of the thickness of a disk. The dimensions of each groove or channel are critical since they (1) determine, in part, the L/EHR ratio of each channel and more particularly, whether laminar flow through the channel is achieved, and (2) affect the structural and dimensional integrity of each disk when a stack of the disks is tightly held together.

Flow restrictors of this type are exemplified in U.S. Pat. No. 3,851,526 and the references cited therein. While these etched channels can be precisely made so as to provide adequately uniform dimensions, the costs for making such elements is relatively expensive.

In another prior art device as shown in U.S. Pat. No. 3,851,526, each disk has a central aperture and one or more radially-directed bores or passageways formed through the interior body of the disk so as to provide fluid connection between the central aperture with the outer perimeter of the disk. The radiallydirected interior passageways are normally formed by precision machining techniques, such as boring, which are relatively expensive processes.

The chemical etching process used in forming channels in the disk faces requires that the strength of the etching chemical (or etchant), be precisely known, and also requires that the surface of the disk face be exposed to the etchant for a precisely measured time in order to properly etch the channels into the disk faces. Small variations in the etching time or etchant strength can result in the formation of a defective channel that will subsequently contribute to turbulent flow or constitute a flaw in the structural integrity of the disk, or both. Proper control of etchant strength and etching time is also relatively expensive.

Accordingly, a general object of this invention is to provide an improved laminar flowmeter which eliminates, or substantially reduces, the problems noted above.

A more specific object is to provide an improved flow restriction element particularly useful in the non-measuring or main branch of a mass flowmeter for insuring substantially laminar fluid flow through the main branch.

Another object of the present invention is to provide a relatively inexpensive, easily manufacturable, flow restriction element for use in the non-measuring branch of a split-flow mass flowmeter.

Other objects of the invention will in part be obvious and will in part appear hereinafter. The invention accordingly comprises the apparatus possessing the construction, combination of elements, and arrangement of parts which are exemplified in the following detailed disclosure, and the scope of the application of which will be indicated in the claims.

These and other objects of the present invention are achieved by an improved mass flowmeter of the type including an inlet, an outlet, and at least two passageways for carrying the fluid from the inlet to the outlet. Means are provided for measuring the rate of fluid flow through one of the two passageways, while an improved fluid flow control member is provided in the other passageway for ensuring substantially laminar flow of fluid passing through the other passageway. The improved fluid flow control member comprises one or more pairs of stacked, axially juxtaposed or aligned, alternating first and second types of plates. The first type of plate includes (1) an outer perimeter, (2) an inner or approximately centrally disposed aperture defining an inner perimeter positioned inside and spaced from the outer perimeter, and (3) a plurality of slotted openings made through the thickness of the plate and angularly spaced around the plate, each such slotted opening extending from the outer perimeter toward the inner perimeter and terminating at a respective, separate predetermined radial and angular position disposed intermediate the inner and outer perimeter. The second type of these plates has (1) an outer perimeter, (2) an inner or approximately centrally disposed aperture defining an inner perimeter positioned inside and spaced from the outer perimeter of the plate, and (3) a plurality of slotted openings made through the thickness of the plate and angularly spaced around the plate, each such slotted opening extending from the inner perimeter toward the outer perimeter and terminating at a respective, separate predetermined radial and angular position disposed intermediate the inner and the outer perimeter. Each pair of first and second plates are preferably separated from adjacent such pairs by a centrally apertured blank or solid plate. In the preferred form, the central apertures of all types of plates are axially aligned or registered, and the respective termination positions of the slotted openings of each plate of each pair of first and second type plates are also coincident or registered. Thus, each slotted opening in a first type plate provides fluid communication between the inner perimeter of the first type plate to the coincident termination position and the corresponding slotted opening in an adjacent second type plate, terminating at the coincident termination position provides fluid communication between the latter and the outer perimeter of the second type plate. The slotted openings are dimensioned so as to ensure substantially laminar flow of fluid through the flow control member.

For a fuller understanding of the nature and objects of the present invention, reference should be had to the following detailed description taken in connection with the accompanying drawings wherein.

Figure 1:
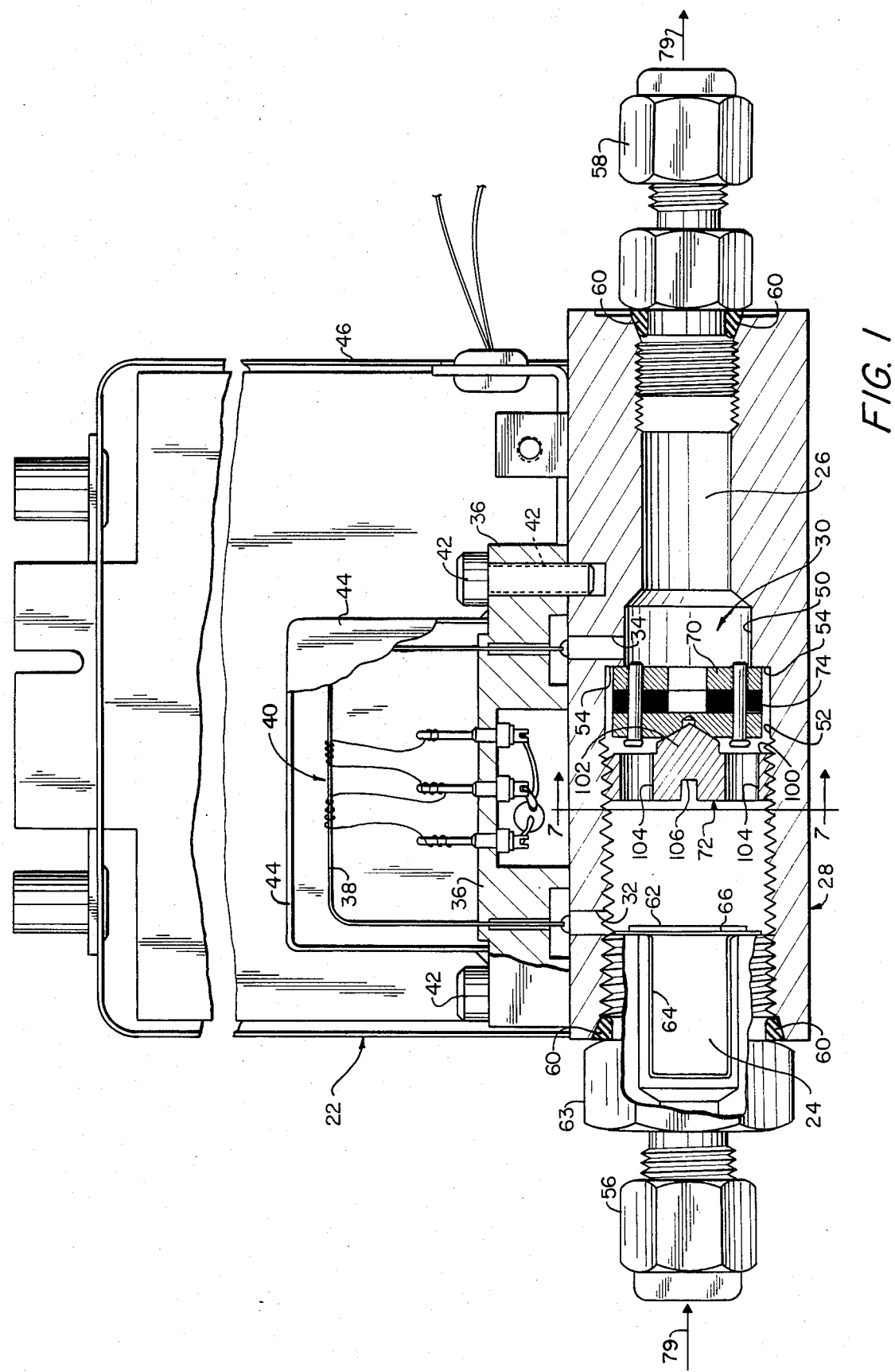
FIG. 1 is a longitudinal cross-sectional view in elevation of the preferred embodiment of the mass flowmeter of the present invention.

Turning first to FIG. 1, the preferred flowmeter 22 comprises fluid inlet 24, fluid outlet 26, and at least two branches providing separate fluid passageways between inlet 24 and outlet 26. The separate passageways respectively define the measuring and non-measuring branches of the flowmeter. Flowmeter 22 includes main housing 28 comprising axially-extending central bore 30 for defining the main or non-measuring fluid pathway or branch. Flowmeter 22 also includes radially-directed inlet sensing port 32 and radially-directed outlet sensing port 34 for respectively defining the input and output of the measuring fluid pathway or branch. Each port 32 and 34 extends through the wall of housing 28 to bore 30, with outlet sensing port 34 be being axially spaced downstream from inlet sensing port 32.

Housing 28 also supports guide block 36. The latter supports capillary tube 38 having one end extending through the block 36 and in fluid communication with inlet sensing port 32. The other end of tube 38 extends through block 36 and is in fluid communication with outlet sensing port 34, so that the tube 38 constitutes the measuring fluid passageway or branch of the flowmeter. Block 36 also includes flow rate measuring apparatus 40 for measuring the rate of flow of fluid through the tube 38. Apparatus 40 illustrated in FIG. 1 is preferably a thermal type measuring apparatus, but could be any of several other well known types of flow rate measuring means, since the flow rate measuring apparatus per se does not comprise a part of the present invention. Thermal type measuring apparatus 40 is of a type well known in the art and operates on the principle that a give fluid (having a known density, viscosity, specific heat, etc.) will absorb heat at a certain rate which depends on the mass of the fluid that passes the heat source per unit time. Block 36 is attached to housing 28 by suitable means such as bolts 42. Shield 44 is attached to the top of block 36 so as to provide a heat shield for flow rate measuring apparatus 40. The volume inside shield 44 and surrounding apparatus 40 is preferably insulated in order to prevent air circulation around the sensing wires associated with apparatus 40 and to secure the wires in place, thereby minimizing the possibility of calibration problems and the problem of attitude sensitivity both caused by movement of the sensing wires. Cover 46 is secured to the top of housing 28 so as to completely cover shield 44. The elements and operation of the flowmeter 22 described above are well known in the art and thus have not been set forth in greater detail.

In accordance with the present invention, housing 28 is constructed to accommodate novel means for ensuring substantially laminar flow of fluid through the main branch of the flowmeter.

Housing 28 is provided with first counterbore 50, coaxial with and near the approximate longitudinal center of bore 30 so as to intersect outlet sensing port 34. Second counterbore 52 in housing 28 coaxial with both bore 30 and counterbore 50, extends from inlet 24 and intersects port 32 to form inner radially-directed shoulder 54 with first counterbore 50. The upstream end of second counterbore 52 and the downstream end of bore 30 are each (a) threaded so as to receive respective intake and exhaust fittings 56 and 58, and (b) countersunk so that annular seal member 60 can be provided between the housing and each fitting to prevent fluid leaking therebetween. A screen or mesh filter 62 is secured in hollow cylindrical, externally-threaded nut 63 which is combined with inlet fitting 56 to provide a compressiontype connection to metal tubing, so that the filter is secured in second counterbore 52 at inlet 24, upstream from inlet sensing port 32. Filter 62 is dimensioned so that large particulate matter is removed from the fluid entering the flowmeter. Preferably, filter 62 is made of a screen or mesh material having interstices sized so that particles no larger than about 5 microns are passed by the filter, although the dimensions can vary according to choice. Preferably, the filter includes cylindrical tubular section 64 approximately coaxially positioned with respect to the center axis of second counterbore 52, and flat disk section 66 secured to the downstream end of section 64 so that all fluid entering inlet 24 passes through the screen before it passes through flow control member 70 positioned downstream from the filter.

Figure 3:
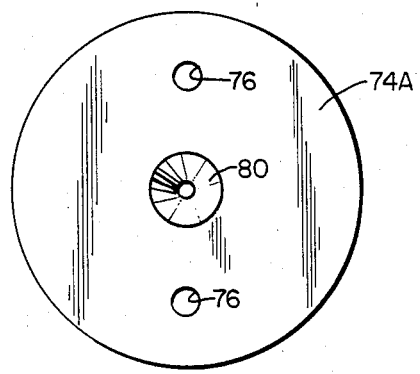
FIG. 3 is an enlarged frontal view of the end annular plate at the upstream end of the flow control member taken along line 3—3 of FIG. 2.
Figure 4:
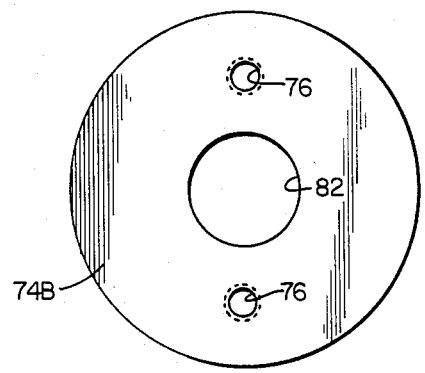
FIG. 4 is an enlarged frontal view of a "blank" plate used for separating pairs of slotted type plates, and also is useful as the end annular plate at the downstream end of the flow controller taken along line 4—4 of FIG. 2.

Flow control member 70 is adapted to redirect axial fluid flow along the non-measuring branch of the flowmeter into small radial passageways dimensioned to ensure substantially laminar flow along the branch. Member 70 is preferably axially centered and positioned in second counterbore 52 against shoulder 54 by retaining member 72. More specifically, preferred flow control member 70, shown in greater detail in FIGS. 2-6, includes a plurality of disk-shaped plates 74. Each of plates 74 preferably has the same outer diameter, the latter being smaller than the internal diameter of second counterbore 52 of housing 28 and larger than the internal diameter of first counterbore 50. Thus, when member 70 is properly positioned against shoulder 54, the outer edges of the plates are radially spaced from the inner wall of second counterbore 52 of housing 28. Each of the plates also includes at least two apertures 76 (some of which are preferably threaded except where noted below) positioned so as to respectively receive two centering pins 78. The latter serve as guides so that all of the plates can be axially aligned or juxtaposed along a central axis 79 (as viewed in FIG. 1) in a serial stacked relationship to form a cylindrical unit. Upstream end plate 74A shown in detail in FIG. 3, is provided on the upstream surface (facing inlet 24) with countersunk recess 80, preferably coaxially positioned with central axis 79. Downstream end plate 74B, shown in detail in FIG. 4, is provided with central aperture 82, preferably also coaxially positioned with respect to axis 79. Plate 74B is threaded to accept the two centering pins 78. The remaining plates 74C and 74D are positioned between the two end plates 74A and 74B, and are preferably stacked in series in an alternating relation. In a preferred embodiment, between each pair of plates 74C and 74D is interposed a blank plate. Plates 74C and 74D each include a respective central aperture 84, preferably coaxially positioned with respect to one another as well as to central aperture 82. In plates 74A, 74C and 74D, apertures 76 are not threaded.

Figure 5:
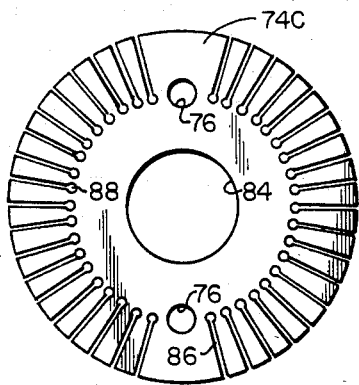
FIG. 5 is an enlarged frontal view of a first type of annular plate of the flow control member taken along line 5—5 of FIG. 2.

As shown in FIG. 5, each of the first type of annular plates 74C has a plurality of slotted openings or slots 86 penetrating the thickness of the plate and preferably extending in a radial direction from the outer perimeter of the plate inward to a termination position approximately halfway toward central aperture 84. The number of slots in each plate 74C can be varied, thirty-six (36) such slots being typical. The angular positions of the slots are also a matter of choice, with the slots preferably being angularly spaced apart as much as possible without interfering with apertures 76. Thus, where apertures 76 are disposed 180 degrees apart about central axis 79, an equal number of slots are equiangularly spaced about each sector of the plate between apertures 76. The inner end of each slot 86 terminates in small circular hole 88 to help prevent fracture of the plate at the end of each slot 86, to allow adequate overlap with hole 92 of plate 74D, and to eliminate the need for extreme precision in aligning parts with one another.

Figure 6:
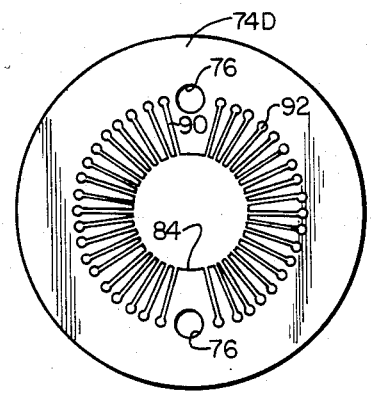
FIG. 6 is an enlarged frontal view of a second type of annular plate of the flow control member taken along line 6—6 of FIG. 2.

As illustrated in FIG. 6, second type annular plate 74D has a plurality of slots 90 cut through the plate thickness. The number of slots 90 of each plate 74D is preferably the same as the number of slots 86 of each plate 74C. Slots 90 extend from central aperture 84 outwardly toward the outer perimeter of the plate. The outer end of each slot 90 terminates in a small circular hole 92 which serves substantially the same purposes here as did holes 88 in plate 74C. The length and angular position of each slot 90 is such that holes 92 of each plate 74D are, when plates 74C and 74D are registered, in fluid communication with corresponding hole 88 of a respective slot 86 of adjacent plate 74C. Notwithstanding that FIGS. 5 and 6 show holes 88 and 92 positioned about half the distance between the outer perimeter and central aperture of each of the plates 74C and 74D, the lengths of slots 86 and 90 can be variable provided that respective holes 88 and 92 of adjacent plates communicate with one another. Thus, for example, slots 86 could extend about two-thirds of the distance from the outer perimeter to central aperture 84 and slots 90, radially aligned with slots 86, could extend about one-third of the distance from central aperture 84 toward the outer perimeter of the place so that holes 88 and 92 are aligned and communicate with one another. Further, while all of slots 86 and 90 are desirably oriented in a straight, radial direction, they can also be curved or even oriented in nonradial directions, as for example shown in FIGS. 8 and 9, if adjacent holes 88 and 92 of adjacent plates are aligned and in fluid communication when the plates are registered or stacked together as shown in the exploded view of FIG. 2. Slots 86 and 90 thus combine to form radial fluid passageways from second counterbore 52 to the inner space formed by central apertures 82 and 84. The width of the slots and thickness of plates 74C and 74D should be carefully controlled so as to provide the proper L/EHR ratio which will ensure substantially laminar flow through flow control member 70 and thus along the non-measuring branch of the flowmeter.

Figure 2:
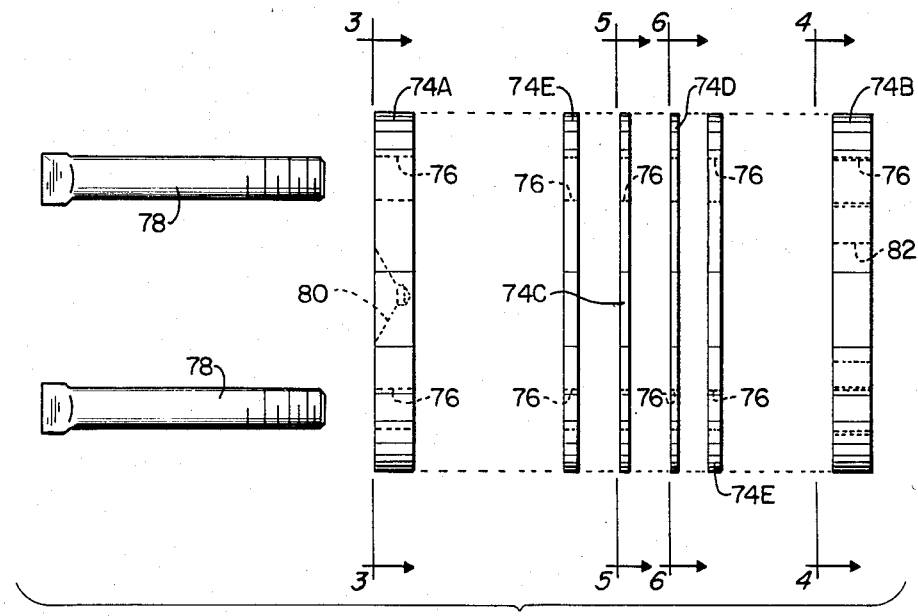
FIG. 2 is an enlarged and exploded side view in elevation of the flow control member of the flowmeter of FIG. 1.

As shown in FIG. 2, plates 74C and 74D are preferably sandwiched between two plates 74E which serve as axial boundaries for the radial passageways formed in the uppermost upstream and lowermost downstream plates of stacked plates 74C and 74D. Each plate 74E is identical in plan to the end plate except that they are preferably thinner and apertures 76 thereof need not be threaded.

Figure 7:
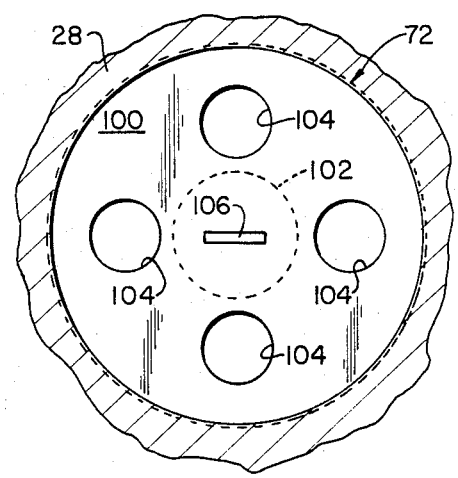
FIG. 7 is a fragmentary cross-sectional view of the retaining member for positioning the flow control member, taken along line 7—7 of FIG. 1.

Finally, in order to maintain flow control member 70 on proper position in second counterbore 52, the preferred form of retaining member 72 (shown in FIGS. 1 and 7) comprises disk-shaped portion 100 and centering nose portion 102 adapted to cooperate with recess 80 of upstream end plate 74A. Disk-shaped portion 100 is screw-threaded around its peripheral edge so that the member can be screwed into the threaded portion of counterbore 52. Nose portion 102 is thus in engagement with recess 80 of upstream end plate 74A and flow control member 70 is properly centered and held against shoulder 54. The preferred form of retaining member 72 also includes a plurality of apertures 104 extending through disk-shaped portion 100. Apertures 104 are angularly positioned around nose portion 102 for allowing fluid to flow through retaining member 72 and to enter flow control member 70 through the openings provided by slots 86 at the outer perimeter of each of plates 74C. Preferably, as shown in FIG. 7, the upstream end surface of member 72 has slot 106 near its center to provide means for receiving a suitable tool, in order to screw retaining member 72 into and out of the threaded portion of counterbore 52.

Figure 8:
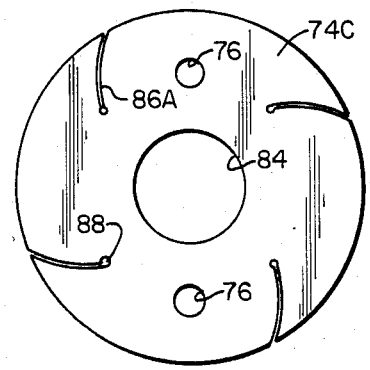
FIG. 8 is an enlarged frontal view of a modified embodiment of a first type annular plate of the flow control member.
Figure 9:
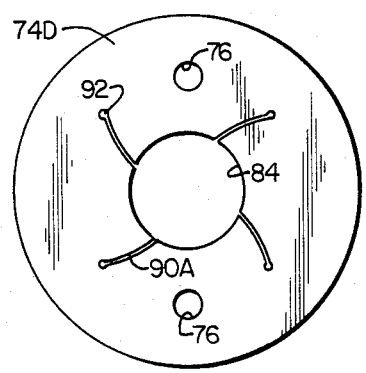
FIG. 9 is an enlarged frontal view of a modified embodiment of a second type annular plate of the flow control member.

FIG. 8 illustrates a modified plate 74C having only four slots 86A, each of which follow an arcuate path from the outer perimeter of the plate to holes 88 between central aperture 84 and the outer perimeter of the plate. Holes 88 are positioned coaxially with holes 92 in modified plate 74D depicted in FIG. 9 when plates 74C and 74D are axially juxtaposed. It is to be noted that slots 90A in plate 74D are curvilinear in a manner similar to slots 86A in plate 74C. Furthermore, plates 74C and 74D may be modified to have slots 86 and 90 configured in any other nonlinear pattern or a linear pattern skewed in a non-radial direction provided that the L/EHR ratio of the radial passageways formed by the slots will ensure laminar flow through the radial passageways.

The operation of the present invention will now be described. As shown in FIG. 1, fluid enters the flowmeter through inlet 24, passes through filter 62, and flows into second counterbore 52. Filter 62 removes particulate material from the fluid to minimize clogging the radial passageways formed by slots 86 and 90 of plates 74C and 74D of member 70. The fluid passes through apertures 104 of retaining member 72, to the outer surface of flow control member 70, and enters the radial passageways formed by slots 86 and 90 through the openings provided by slots 86 at the outer perimeter of plates 74C. The fluid flows through slots 86 and holes 88 where it enters slots 90 through holes 92, and flows to the inner space of flow control member 70. These passageways provide laminar flow of the fluid due to the predetermined L/EHR ratio of each of the passageways. The fluid exits the radial passageways through the openings provided by slots 90 at the inner periphery of openings 84 of plates 74D, and thence into the inner space of flow control member 70. The fluid then exits member 70 through aperture 82 of downstream end plate 74B into first counterbore 50 of housing 28. The fluid discharges through first counterbore 50 and bore 30 through outlet 26 and exits flowmeter 22 through discharge fitting 58.

Simultaneously, as fluid flows through housing 28, fluid also enters inlet sensing port 32, is transferred through capillary tube 38, and exits through outlet sensing port 34 into first counterbore 50. Flow measuring apparatus 40 senses flow through capillary tube 38 by means well known to one skilled in the art. Fluid flow through each of tube 38 and flow control member 70 is substantially laminar so that the measured flow through tube 38 will have a constant proportional relationship to the flow through flow control member 70, independent of viscosity, pressure, and temperature fluctuations.

The primary advantage of this invention over the prior art is the simplicity of the design of flow control member 70 and, in particular, of annular plates 74C and 74D. This simple design, which requires slots 86 and 90 to penetrate the total thickness of plates 74C and 74D, respectively, greatly reduces the cost of manufacturing flow control member 70. The cross-sectional dimension of each slot 86 and 90 in the axial direction is determined by the thickness of respective plate 74C or 74D through which the slot is formed, while the other cross-sectional dimension is determined by the width of each slot 86 or 90. These dimensions are much easier to control than the etchant strength and etching time variables required to form a channel in the face of a prior art disk as discussed hereinbefore. It is also much easier to control these cross-sectional dimensions of the present invention than to form an interior bore in a prior art disk as also discussed hereinbefore.

One method of forming the slots of the present invention is by chemical etching. Since the slots penetrate the total thickness of plates 74C and 74D, variations in the etchant strength and etching time are not nearly as critical as with the prior art disks. The strength of the etchant and the etching time need only meet the requirement that a slot be etched completely through plate 74C or 74D. Once that requirement is met, substantial leeway exists as to how much longer the surface of the plate may be exposed to the etchant, regardless of the etchant strength, as long as the unexposed surface of the plate 74C or 74D is adequately masked from the etchant. This leeway allows for significant cost reduction in the manufacturing process for plates 74C and 74D. Alternatively, the slots may be simply cut through the respective plates with appropriate saws or the like.

Since certain changes may be made in the above apparatus without departing from the scope of the present invention, it is intended that all matter contained in the above description or shown in the above description and shown in the accompanying drawings shall be interpreted in an illustrative and not in a limiting sense.

What is claimed is:

1. For use in a fluid flowmeter, an improved flow control member comprising in combination:
   a pair of plates, each having an outer periphery and a substantially central aperture defining an inner periphery, each plate having a pair of parallel side surfaces extending between said in inner and outer peripheries;
   a first of said plates having at least one slotted opening forming a passage through said first plate and through said side surfaces thereof and extending from said inner periphery to a first termination position disposed intermediate said inner and outer peripheries;
   the second of said plates having at least one slotted opening forming a passage through said second plate and through said side surfaces thereof and extending from said outer periphery to a second termination position disposed intermediate said inner and outer peripheries;
   said plates being in contact with one another along respective facing side surfaces in registered relation wherein said central apertures are substantially aligned with one another and said first termination position is coincident with said second termination position so that said slotted openings constitute a fluid conduit extending between said inner and outer peripheries.

2. A flow control member according to claim 1 further comprising a plurality of said pairs of plates.

3. A flow control member according to claim 1 wherein said first of said plates includes a plurality of separate slotted openings, each forming a corresponding passage through said first plate and through said side surfaces thereof and extending from said inner periphery to a plurality of separate first termination positions disposed intermediate said inner and outer peripheries;
   the second of said plates includes a plurality of separate slotted openings, each forming a corresponding passage through said second plate and through said side surfaces thereof and extending from said outer periphery to a plurality of separate second termination positions disposed intermediate said inner and outer peripheries;

said plates being in contact with one another along respective facing side surfaces in registered relation wherein at least some of said first termination positions are coincident with corresponding ones of said second termination positions so that the slotted openings with conincident termination positions each constitute a fluid conduit extending between said inner and outer peripheries.

4. A flow control member according to claim 1 wherein said pair of plates are held in registered relation by means comprising two or more elongate pins, each of said pins having a length dimension greater than the total thickness dimension of said pair of plates when said plates are in said contact;

two or more corresponding apertures in each of said plates sized so as to slidingly accommodate said elongate pins; and means for fastening said pair of plates to said pins after said pins have been disposed within said corresponding apertures of said plates.

5. A flow control member according to claim 1 wherein said pair of plates have an annular ring cross-sectional configuration with said outer peripheries being concentric with said inner peripheries.

6. A flow control member according to claim 1 wherein said slotted openings lie along straight lines extending substantially radially from said central apertures to said outer peripheries.

7. A flow control member according to claim 1 wherein said slotted openings lie along a curvilinear radially directed path between said inner and outer peripheries of said pair of plates.

8. A flow control member according to claim 1 wherein said slotted openings lie along paths which are skewed from radial directions.

9. For use in a flowmeter, an improved flow control member comprising in combination:

at least one pair of first and second plates, each first plate having a predetermined thickness and cross-sectional configuration and each second plate having a corresponding cross-sectional configuration and a predetermined thickness;

each of said first and second plates having (1) an outer perimeter, and (2) a central aperture of predetermined cross-sectional dimensions defining an inner perimeter radially spaced from said outer perimeter;

each of said first plates having one or more first slotted openings angularly spaced around said first plate, each of said slotted openings penetrating said thickness of said first plate and extending radially through said first plate from said inner perimeter toward said outer perimeter and terminating at a first predetermined radial and angular position intermediate said inner perimeter and said outer perimeter of said first plate;

each of said second plates having one or more second slotted openings angularly spaced around said second plate, each of said slotted openings penetrating said thickness of said second plate and extending radially through said second plate from said outer perimeter toward said inner perimeter and terminating at a second predetermined radial and angular position intermediate said outer perimeter and said inner perimeter of said second plate; and means for maintaining said first and second plates in radial and axial alignment so that each of said first predetermined positions is in registration with a corresponding one of said second predetermined position of said second slots so as to provide fluid communication between said first and second outer perimeters and said first and second inner perimeters and thereby provide for radial fluid flow through said paired plates.

10. A flow control member according to claim 9 wherein said first and second slotted openings lie along a straight line through the diameter of said first and second plates.

11. A flow control member according to claim 9 wherein said first and second slotted openings lie along a curvilinear path between said central apertures and said outer perimeters of said first and second plates.

12. A flow control member according to claim 9 wherein said means for maintaining said first and second plates in radial and axial alignment comprises in combination:

at least two off-center apertures formed in said first and second plates; and at least two corresponding pins, each of said pins extending through one of said off-center apertures of each of said plates so as to fixedly position said first and second plates with respect to one another.

13. A flow control member according to claim 12 wherein said pins have a head at one end, and an opposite end which is threaded, and wherein said means for maintaining said first and second plates in radial and axial alignment further comprises an upstream end plate having corresponding off-center apertures so as to receive said pins; and a downstream end plate having corresponding off-center apertures, said apertures being threaded so as to receive said pins and thereby fasten said downstream end plate to said threaded ends of said pins, said downstream end plate further having a central aperture coaxial with said central apertures of said first and second plates.

14. A flow control member according to claim 9 wherein each of said first and second plates has thirty-six first slotted openings and thirty-six second slotted openings respectively, through said plate thicknesses.

15. A flow control member according to claim 9 wherein said first and second plates have an annular ring cross-sectional configuration with said outer perimeters being concentric with said inner perimeters.

16. A flowmeter comprising in combination:

a fluid inlet;

a fluid outlet;

a housing connected between said fluid inlet and fluid outlet for defining a first fluid path therebetween;

a mass flow control member comprising a plurality of first and second plates each having a predetermined thickness, said first and second plates being alternately stacked in axial juxtaposition;

each of said first annular plates including (1) a first outer perimeter, (2) a first central aperture for defining a first inner perimeter radially spaced from said outer perimeter of said first annular plate, and (3) a plurality of first slotted openings angularly spaced around said first plate, each slotted opening penetrating said thickness of said plate and extending through said first plate from said inner perimeter toward said outer perimeter and terminating at a first predetermined radial and angular position intermediate said outer perimeter and said inner perimeter;

each of said second annular plates including (1) a second outer perimeter having the same cross-sectional dimensions as said first outer perimeter, (2) a second central aperture for defining a second inner perimeter of said second plate, said second aperture of said second plate having the same cross-sectional dimensions as said first central aperture of said first annular plate, and (3) a corresponding plurality of second slotted openings angularly spaced around said second plate, each of said second slotted openings penetrating said plate thickness and extending radially through said second plate from said second outer perimeter toward said second inner perimeter and terminating at a second predetermined radial and angular position intermediate said second inner perimeter and said second outer perimeter;

said slotted openings in both said first and second plates being dimensioned to provide substantially laminar fluid flow therethrough;

means for maintaining said first and second plates in radial and axial alignment in said flow control member so that said first and second predetermined radial and axial positions of said plates are in fluid communication with each other, and so that said first and second central apertures of said plates are in fluid communication with said outer perimeters of said plates;

means for supporting said fluid control member in said first fluid path for directing fluid flow radially between said inner perimeters and said outer perimeters;

capillary tube means dimensioned to provide substantially laminar fluid flow therethrough and connected between said inlet and outlet for defining a second fluid path; and means for measuring the rate of flow of fluid through said capillary tube means.

* * * * *